(12) United States Patent
Sakuma et al.

(10) Patent No.: US 11,213,799 B2
(45) Date of Patent: Jan. 4, 2022

(54) ADSORBENT FOR RADIOACTIVE ANTIMONY, RADIOACTIVE IODINE AND RADIOACTIVE RUTHENIUM, AND TREATMENT METHOD OF RADIOACTIVE WASTE WATER USING THE ADSORBENT

(71) Applicants: EBARA CORPORATION, Tokyo (JP); NIPPON CHEMICAL INDUSTRIAL CO., LTD., Tokyo (JP)

(72) Inventors: Takashi Sakuma, Tokyo (JP); Makoto Komatsu, Tokyo (JP); Takeshi Izumi, Tokyo (JP); Shinsuke Miyabe, Tokyo (JP); Yutaka Kinose, Tokyo (JP); Kiyoshi Satou, Tokyo (JP); Kenta Kozasu, Tokyo (JP); Mari Tokutake, Tokyo (JP); Takeshi Sakamoto, Tokyo (JP); Kaori Sugihara, Tokyo (JP)

(73) Assignees: EBARA CORPORATION, Tokyo (JP); NIPPON CHEMICAL INDUSTRIAL CO., LTD., Tokyo (JP)

(*) Notice: Subject to any disclaimer, the term of this patent is extended or adjusted under 35 U.S.C. 154(b) by 864 days.

(21) Appl. No.: 16/065,386

(22) PCT Filed: Dec. 8, 2016

(86) PCT No.: PCT/JP2016/086485
§ 371 (c)(1),
(2) Date: Jun. 22, 2018

(87) PCT Pub. No.: WO2017/110485
PCT Pub. Date: Jun. 29, 2017

(65) Prior Publication Data
US 2019/0009245 A1 Jan. 10, 2019

(30) Foreign Application Priority Data

Dec. 24, 2015 (JP) .............................. JP2015-252082

(51) Int. Cl.
| | | |
|---|---|---|
| B01J 20/06 | (2006.01) | |
| G21F 9/12 | (2006.01) | |
| B01J 20/28 | (2006.01) | |
| C01F 17/235 | (2020.01) | |
| B01J 20/02 | (2006.01) | |
| B01J 20/281 | (2006.01) | |
| C02F 1/28 | (2006.01) | |

(52) U.S. Cl.
CPC ............ *B01J 20/06* (2013.01); *B01J 20/0233* (2013.01); *B01J 20/0292* (2013.01); *B01J 20/281* (2013.01); *B01J 20/28004* (2013.01); *B01J 20/28011* (2013.01); *B01J 20/28016* (2013.01); *B01J 20/28052* (2013.01); *C01F 17/235* (2020.01); *C02F 1/281* (2013.01); *G21F 9/12* (2013.01); *C01P 2002/82* (2013.01); *C01P 2002/88* (2013.01); *C01P 2004/61* (2013.01)

(58) Field of Classification Search
CPC .... B01J 20/06; B01J 20/0233; B01J 20/0292; B01J 20/28004; B01J 20/28011; B01J 20/28016; B01J 20/28052; B01J 20/281; C01F 17/235; C01F 1/281; G21F 9/12; C01P 2002/82; C01P 2002/88; C01P 2004/61
See application file for complete search history.

(56) References Cited

U.S. PATENT DOCUMENTS

| | | |
|---|---|---|
| 4,622,176 A | 11/1986 | Motoki et al. |
| 2012/0261345 A1 | 10/2012 | Hassler et al. |
| 2016/0211040 A1 | 7/2016 | Kani et al. |

FOREIGN PATENT DOCUMENTS

| | | |
|---|---|---|
| EP | 0 608 057 A1 | 7/1994 |
| EP | 2 243 547 A1 | 10/2010 |
| JP | S50-140799 A | 11/1975 |
| JP | S60-19035 A | 1/1985 |
| JP | S60-161598 A | 8/1985 |
| JP | S61-187931 A | 8/1986 |
| JP | H06-214095 A | 8/1994 |
| JP | 2001-133594 A | 5/2001 |
| JP | 2007-098362 A | 4/2007 |
| JP | 2013-104727 A | 5/2013 |

(Continued)

OTHER PUBLICATIONS

Japanese Office action issued in Japanese Patent Application No. 2015-252082 dated Dec. 4, 2019.
"High Performance Multinuclear Removal Equipment Task Force, 3-2, High Performance Multinuclear Species Removal Equipment (Online)", 2014, pp. 1-43 (pp. 8-15).
International Search Report issued in Patent Application No. PCT/JP2016/086485 dated Feb. 7, 2017.

(Continued)

*Primary Examiner* — Edward M Johnson
(74) *Attorney, Agent, or Firm* — Pearne & Gordon LLP

(57) ABSTRACT

An adsorbent capable of adsorbing radioactive antimony, radioactive iodine and radioactive ruthenium, the adsorbent containing cerium(IV) hydroxide in a particle or granular form having a particle size of 250 μm or more and 1200 μm or less; and a treatment method of radioactive waste water containing radioactive antimony, radioactive iodine and radioactive ruthenium, the treatment method comprising passing the radioactive waste water containing radioactive antimony, radioactive iodine and radioactive ruthenium through an adsorption column packed with the adsorbent, to adsorb the radioactive antimony, radioactive iodine and radioactive ruthenium on the adsorbent, wherein the adsorbent is packed to a height of 10 cm or more and 300 cm or less of the adsorption column, and wherein the radioactive waste water is passed through the adsorption column at a linear velocity (LV) of 1 m/h or more and 40 m/h or less and a space velocity (SV) of 200 $h^{-1}$ or less.

6 Claims, 7 Drawing Sheets

(56) References Cited

FOREIGN PATENT DOCUMENTS

| | | |
|---|---|---|
| JP | 2013-241312 A | 12/2013 |
| JP | 2014-238407 A | 12/2014 |
| JP | 2015-505718 A | 2/2015 |
| JP | 2015-045606 A | 3/2015 |
| JP | 2015-059852 A | 3/2015 |
| JP | 2015-059870 A | 3/2015 |
| JP | 2015-181972 A | 10/2015 |
| JP | 5793230 B1 | 10/2015 |
| JP | 5793231 B1 | 10/2015 |
| WO | 2013-176956 A2 | 11/2013 |

OTHER PUBLICATIONS

Written Opinion issued in Patent Application No. PCT/JP2016/086485 dated Feb. 7, 2017.
Komatsuzaki, Yuko, et al., "Development of wide-varied adsorbents for one through purification of multi-nuclides contaminated water (2) Sb and iodate ions absorption characteristics of an activated carbon impregnated with ceria", Atomic Energy Society of Japan, "Abstracts of 2013 Fall Meeting" of the Atomic Energy Society of Japan, Sep. 3-5, 2013, Hachinohe Institute of Technology, p. 648.
Extended European Search Report issued in European Patent Application No. 16 87 8377 dated Jun. 25, 2019.
Mištová, Eva, et al., "Selective Sorption of Sb(V) Oxoanion by Composite Sorbents Based on Cerium and Zirconium Hydrous Oxides", Ion Exchange Letters, Department of Power Engineering, Institute of Chemical Technology, Prague, Czech Republic, vol. 1, (2008) pp. 4-6.
Japanese Office Action issued in Japanese Patent Application No. 2015-252082 dated May 10, 2019.

ADSORBENT FOR RADIOACTIVE ANTIMONY, RADIOACTIVE IODINE AND RADIOACTIVE RUTHENIUM, AND TREATMENT METHOD OF RADIOACTIVE WASTE WATER USING THE ADSORBENT

TECHNICAL FIELD

The present invention relates to a treatment method of radioactive waste water containing radioactive antimony, radioactive iodine and radioactive ruthenium, in particular, an adsorbent capable of removing the radioactive antimony, radioactive iodine and radioactive ruthenium contained in radioactive waste water containing contaminating ions such as a Na ion, a Ca ion and/or a Mg ion, generated in a nuclear power plant, and a treatment method of the radioactive waste water.

BACKGROUND ART

The accident caused by the Great East Japan Earthquake on Mar. 11, 2011, in the Fukushima Daiichi Nuclear Power Station, has generated a large amount of radioactive waste water containing radioactive antimony, radioactive iodine and radioactive ruthenium. The radioactive waste water includes: the contaminated water generated due to the cooling water poured into a reactor pressure vessel, a reactor containment vessel, and a spent fuel pool; the trench water accumulated in a trench; the sub-drain water pumped up from a well called a sub-drain in the periphery of a reactor building; groundwater; and seawater (hereinafter, referred to as "radioactive waste water"). Radioactive substances are removed from these radioactive waste waters by using a treatment apparatus called, for example, SARRY (Simplified Active Water Retrieve and Recovery System (a simple type contaminated water treatment system) cesium removing apparatus) or ALPS (a multi-nuclide removal apparatus), and the water thus treated is collected in a tank.

Titanium oxide is used as an adsorbent for radioactive antimony, a silver-impregnated activated carbon is used as an adsorbent for radioactive iodine, and an ion exchange resin is used as an adsorbent for radioactive ruthenium. However, the detected values of the radioactive antimony, radioactive iodine and radioactive ruthenium exceed their removal target values; and thus sufficient removal has not been achieved.

In addition, it has been reported that radioactive antimony can be removed by adsorption with zirconium (PTL 1), radioactive iodine can be removed by adsorption with a porous inorganic oxide supporting a noble metal such as Pd, Pt, Rh and Ag (PTL 2), and radioactive ruthenium can be removed by adsorption with an ion exchange resin used in combination with a pH adjuster or a redox agent (PTL 3).

However, the adsorbents disclosed in PTLs 1 to 3 are each an adsorbent adsorbing and removing only a specific radioactive element. It has not been proposed an adsorbent, by it alone, capable of adsorbing and removing radioactive antimony, radioactive iodine and radioactive ruthenium, all together. Moreover, the radioactive iodine includes iodide ion and iodate ion; accordingly, only for the purpose of adsorbing and removing radioactive iodine, it is necessary to use two different types of adsorbents. For the purpose of decontaminating seawater or the like contaminated with various radioactive substances, it is necessary to use an appropriate adsorbent for each of the radioactive substances; causing a problem of raising the costs for a plurality of adsorption columns and a plurality of chemicals for using a plurality of types of adsorbents.

PTL 4 discloses that hydroxides of rare earth elements are effective as adsorbents for arsenic and arsenic anion, but does not disclose that hydroxides of rare earth elements can adsorb radioactive antimony, radioactive iodine and radioactive ruthenium, all together. In addition, in the infrared absorption spectrum of cerium hydroxide disclosed in PTL 4, no absorption peaks of 3270 $cm^{-1}$ or more and 3330 $cm^{-1}$ or less can be identified.

NPL 1 discloses that an activated carbon impregnated with ceria has an adsorption effect for antimony and iodate ion. However, NPL 1 does not disclose that the activated carbon impregnated with ceria can adsorb ruthenium in addition to antimony and iodate ion.

PTL 5 and PTL 6 disclose that a specific cerium hydroxide has an effect of adsorbing iodate ion. However, PTL 5 and PTL 6 do not disclose that the specific cerium hydroxide can adsorb radioactive antimony, radioactive iodine and radioactive ruthenium, all together.

CITATION LIST

Patent Literature

PTL 1: Japanese Patent Laid-Open No. 2014-238407
PTL 2: Japanese Patent Laid-Open No. 2013-104727
PTL 3: Japanese Patent Laid-Open No. 2015-059852
PTL 4: Japanese Patent Laid-Open No. S61-187931
PTL 5: Japanese Patent No. 5793230
PTL 6: Japanese Patent No. 5793231

Non Patent Literature

NPL 1: Yuko Komatsuzaki et al., N37 Development of wide-varied adsorbents for one through purification of multi-nuclides contaminated water (2) Sb and iodate ions absorption characteristics of an activated carbon impregnated with ceria, Abstracts (CD-ROM) of "2013 Fall Meeting" of the Atomic Energy Society of Japan, Atomic Energy Society of Japan, 2013, p. 648.

SUMMARY OF INVENTION

Technical Problem

An object of the present invention is to provide an adsorbent capable of adsorbing and removing radioactive antimony, radioactive iodine and radioactive ruthenium, all together.

In addition, another object of the present invention is to provide a method and an apparatus for purifying radioactive waste water, capable of removing, radioactive antimony, radioactive iodine and radioactive ruthenium with a high removal efficiency and simply, by passing the waste water to be purified through a column packed with one type of the adsorbent.

Solution to Problem

As a result of a diligent study in order to solve the above-described problem, the present inventors have found that a specific adsorbent alone is capable of adsorbing and removing radioactive antimony, radioactive iodine and radioactive ruthenium, wherein the specific adsorbent contains cerium(IV) hydroxide ($Ce(OH)_4$). In addition, the present inventors have also found that radioactive antimony, radioactive iodine and radioactive ruthenium can be removed simply and efficiently by passing radioactive waste water through an adsorption column packed with the aforementioned adsorbent under a specific water passing conditions, and have completed the present invention.

The present invention includes the following aspects.

[1] An adsorbent capable of adsorbing radioactive antimony, radioactive iodine and radioactive ruthenium, the adsorbent comprising cerium(IV) hydroxide having the following properties: (1) a granular form having a particle size of 250 μm or more and 1200 μm or less, (2) in a thermogravimetric analysis, a weight reduction ratio is 4.0% or more and 10.0% or less when the temperature is increased from 200° C. to 600° C., and (3) in an infrared absorption spectrum analysis, absorption peaks are observed in ranges of 3270 cm$^{-1}$ or more and 3330 cm$^{-1}$ or less, 1590 cm$^{-1}$ or more and 1650 cm$^{-1}$ or less, and 1410 cm$^{-1}$ or more and 1480 cm$^{-1}$ or less.

[2] The adsorbent according to [1], wherein a content of the cerium(IV) hydroxide is 99.0 wt % or more.

[3] The adsorbent according to [1], wherein a content of the cerium(IV) hydroxide is 90.0 wt % or more and 99.5 wt % or less, and the adsorbent further comprises silver phosphate in a content of 0.5 wt % to 10.0 wt %.

[4] The adsorbent according to [1], wherein a content of the cerium(IV) hydroxide is 90.0 wt % or more and 99.0 wt % or less, and the adsorbent further comprises silver phosphate in a content of 0.5 wt % or more and 5.0 wt % or less and manganese dioxide in a content of 0.5 wt % or more and 5.0 wt % or less.

[5] A treatment method of radioactive waste water containing radioactive antimony, radioactive iodine and radioactive ruthenium, the treatment method comprising passing the radioactive waste water containing radioactive antimony, radioactive iodine and radioactive ruthenium through an adsorption column packed with the adsorbent according to any one of [1] to [4], to adsorb the radioactive antimony, radioactive iodine and radioactive ruthenium on the adsorbent, wherein the absorbent is packed to a height of 10 cm or more and 300 cm or less of the adsorption column, and wherein the radioactive waste water is passed through the adsorption column at a linear velocity (LV) of 1 m/h or more and 40 m/h or less and a space velocity (SV) of 200 h$^{-1}$ or less.

[6] The treatment method according to [5], wherein the radioactive waste water further contains a Na ion, a Ca ion and/or a Mg ion.

Advantageous Effects of Invention

The adsorbent of the present invention can adsorb radioactive antimony, radioactive iodine and radioactive ruthenium.

In addition, radioactive antimony, radioactive iodine and radioactive ruthenium can be removed from a waste water with a high removal efficiency and simply by passing the waste water to be purified through an adsorption column packed with the adsorbent of the present invention.

DESCRIPTION OF EMBODIMENTS

Figure 1:
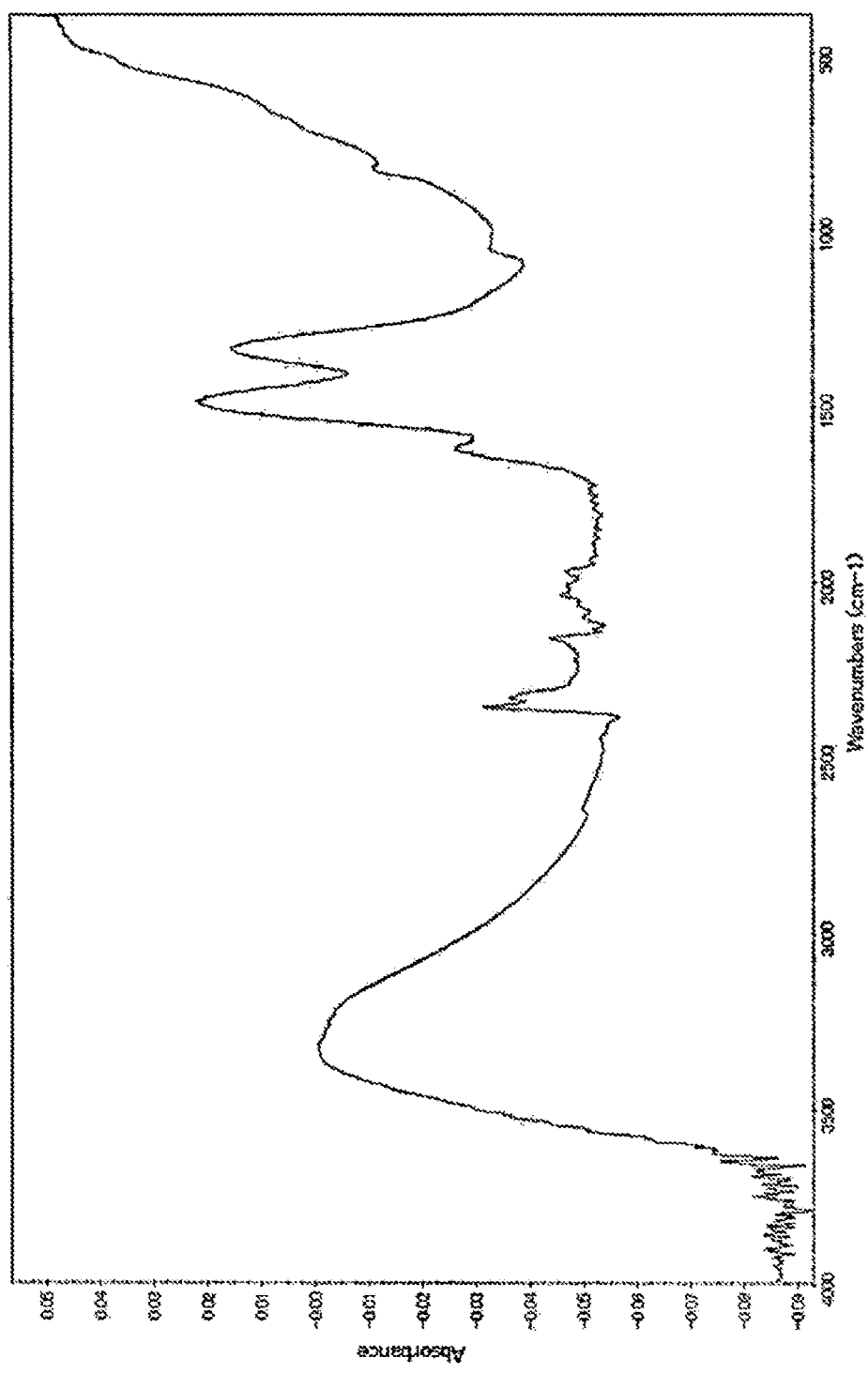
FIG. 1 shows the infrared absorption spectrum of the cerium(IV) hydroxide produced in Production Example 1.

The present invention provides an adsorbent capable of adsorbing radioactive antimony, radioactive iodine and radioactive ruthenium, the adsorbent containing cerium(IV) hydroxide, wherein the cerium(IV) hydroxide has the following properties (1) a particle or granular form having a particle size of 250 μm or more and 1200 μm or less, preferably 300 μm or more and 800 μm or less, and more preferably 300 μm or more and 600 μm or less, (2) in a thermogravimetric analysis, a weight reduction ratio of 4.0% or more and 10.0% or less, and preferably 4.0% or more and 8.0% or less when the temperature is increased from 200° C. to 600° C., and (3) in an infrared absorption spectrum analysis, absorption peaks observed in ranges of 3270 cm$^{-1}$ or more and 3330 cm$^{-1}$ or less, 1590 cm$^{-1}$ or more and 1650 cm$^{-1}$ or less, and 1410 cm$^{-1}$ or more and 1480 cm$^{-1}$ or less.

The adsorbent of the present invention has a finer particle size and a higher adsorption rate as compared with commercially available common adsorbents (for example, zeolite-based adsorbents are pellets having a particle size of approximately 1.5 mm). On the other hand, when a powdery adsorbent is packed within the adsorption column, and water is passed through the adsorption column, the powdery adsorbent flows out the column. Thus, it is preferred that the adsorbent used in the present invention has a predetermined particle size. The adsorbent in a granular form may be prepared by subjecting cerium(IV) hydroxide to known granulation methods such as stirring mixing granulation, tumbling granulation, extrusion granulation, crushing granulation, fluidized bed granulation, spray dry granulation, compression granulation, and melt granulation. A binder is used when a common adsorbent is granulated, but no binder is used for the adsorbent of the present invention. The adsorbent granulated without using a binder is preferable in the method of the present invention using the adsorbent as packed within an adsorption column, since the adsorbent quantity per unit volume is increased, and thus the treatment amount per unit volume of the same adsorption column is increased. Alternatively, the adsorbent in a granular form having a particle size falling within a predetermined range may be obtained by crushing cerium(IV) hydroxide into a granular form and classifying the granular with a sieve.

The adsorbent in a granular form having a particle size falling within the above-described predetermined range used in the present invention preferably has a strength of 0.1 N or more in a wet condition, and does not collapse under to the water pressure (in general, 0.1 to 1.0 MPa) applied by passing the radioactive waste water to be treated for a long period of time.

It is desirable that, for the cerium(IV) hydroxide used in the present invention, in thermogravimetric analysis, a weight reduction ratio is 4.0% or more and 10.0% or less, and preferably 4.0% or more and 8.0% or less when the temperature is increased from 200° C. to 600° C. The ion-exchangeable OH group is controlled within a specific range by setting the weight reduction ratio in thermogravimetric analysis within the above-described range, and accordingly a stable adsorption performance can be maintained.

The infrared absorption peak of 3270 $cm^{-1}$ or more and 3330 $cm^{-1}$ or less is assigned to the stretching vibration of the hydroxyl group, and in particular, the absorption peak is preferably observed in a range of 3290 $cm^{-1}$ or more and 3320 $cm^{-1}$ or less.

The infrared absorption peaks of 1590 $cm^{-1}$ or more and 1650 $cm^{-1}$ or less and 1410 $cm^{-1}$ or more and 1480 $cm^{-1}$ or less are assigned to the bending vibration of the hydroxyl group, and in particular, the absorption peaks are preferably observed in the ranges of 1610 $cm^{-1}$ or more and 1630 $cm^{-1}$ or less and 1430 $cm^{-1}$ or more and 1470 $cm^{-1}$ or less.

For the adsorbent of the present invention, the cerium(IV) hydroxide may be used as it is, or the cerium(IV) hydroxide may also be used as a mixture with an additional component. When the cerium(IV) hydroxide is used as it is, the content of cerium(IV) hydroxide is preferably 99.0 wt % or more, and the balance is preferably inevitable impurities.

In the case of the mixture of the cerium(IV) hydroxide and the additional component, the adsorbent of the present invention preferably has a content of cerium(IV) hydroxide of 90.0 wt % or more and 99.5 wt % or less, and preferably further contains silver phosphate in a content of 0.5 wt % to 10.0 wt %. When the adsorbent of the present invention contains silver phosphate, the capability of adsorbing iodide ion is improved, and by adjusting the proportions of cerium (IV) hydroxide and silver phosphate, the capability of adsorbing iodide ion can be controlled.

Alternatively, the adsorbent of the present invention preferably has a content of cerium(IV) hydroxide of 90.0 wt % or more and 99.0 wt % or less, and preferably further contains silver phosphate in a content of 0.5 wt % or more and 5.0 wt % or less, and manganese dioxide in a content of 0.5 wt % or more and 5.0 wt % or less. When silver phosphate and manganese dioxide are contained, the capabilities of adsorbing iodide ions and ruthenium ions are improved, and by adjusting the proportions of silver phosphate and manganese dioxide, the capabilities of adsorbing iodide ions and ruthenium ions can be controlled.

The present invention also provides a treatment method comprising bringing the adsorbent into contact with waste water containing radioactive antimony, radioactive iodine and radioactive ruthenium. The treatment method of the present invention comprises passing the radioactive waste water containing radioactive antimony, radioactive iodine and radioactive ruthenium through an adsorption column packed with the adsorbent, to adsorb the radioactive antimony, radioactive iodine and radioactive ruthenium on the adsorbent, wherein the absorbent is packed to a height of 10 cm or more and 300 cm or less of the adsorption column, and wherein the radioactive waste water is passed through the adsorption column at a linear velocity (LV) of 1 m/h or more and 40 m/h or less and a space velocity (SV) of 200 $h^{-1}$ or less.

In the treatment method of the present invention, the adsorbent is packed within an adsorption column so as for the layer height to be 10 cm or more and 300 cm or less, preferably 20 cm or more and 250 cm or less, and more preferably 50 cm or more and 200 cm or less. In the case where the layer height is less than 10 cm, the adsorbent layer cannot be packed uniformly when the adsorbent is packed in the adsorption column, thus the waste water is not uniformly passed through the adsorbent layer, and consequently the treated water quality is degraded. Increasing the layer height is preferable since an appropriate pressure difference of passing water can be achieved, the treated water quality is stabilized, and the total amount of the treated water is increased; however, when the layer height exceeds 300 cm, the pressure difference during water passing becomes too large.

The radioactive waste water containing radioactive antimony, radioactive iodine and radioactive ruthenium is passed through the adsorption column packed with the adsorbent, at a linear velocity (LV) of 1 m/h or more and 40 m/h or less, preferably 5 m/h or more and 30 m/h or less, more preferably 10 m/h or more and 20 m/h or less, and at a space velocity (SV) of 200 $h^{-1}$ or less, preferably 100 $h^{-1}$ or less, more preferably 50 $h^{-1}$ or less, and preferably 5 $h^{-1}$ or more, and more preferably 10 $h^{-1}$ or more. When the linear velocity (LV) of water exceeds 40 m/h, the pressure difference of passing water becomes large, and when the linear velocity (LV) of water is less than 1 m/h, the quantity of water to be treated is small. Even at the space velocity (SV) used in common waste water treatment of 20 $h^{-1}$ or less, in particular, approximately 10 $h^{-1}$, the effect of the adsorbent of the present invention can be achieved; however, a waste water treatment using a common adsorbent cannot achieve a stable treated water quality, and cannot achieve a removal effect. In the present invention, the linear velocity (LV) and the space velocity (SV) can be increased without making the size of the adsorption column larger.

The linear velocity (LV) is the value obtained by dividing the water quantity ($m^3$/h) passed through the adsorption column by the cross-sectional area ($m^2$) of the adsorption column. The space velocity (SV) is the value obtained by dividing the water quantity ($m^3$/h) passed through the adsorption column by the volume ($m^3$) of the adsorbent packed in the adsorption column.

The adsorbent, the treatment method and the treatment apparatus of the present invention are suitable for the decontamination of waste water containing a Na ion, a Ca ion and/or a Mg ion.

EXAMPLES

Hereinafter, the present invention is described specifically by way of Examples and Comparative Examples, but the present invention is not limited to these Examples. The analyses of the various components and the various adsorbents were performed using the apparatuses under the conditions described below.

<Thermogravimetric Analysis>

When the temperature of a 30 mg sample was increased at a temperature increase rate of 5° C./min by using the thermogravimetric apparatus TGA/DSC1 manufactured by Mettler-Toledo International Inc., the weight (A) of the sample at 200° C. and the weight (B) of the sample at 600° C. were measured, and the weight reduction ratio was calculated by using the following formula:

$$\text{Weight reduction ratio}(\%) = (A-B)/A \times 100 \quad \text{[Calculation formula]}$$

<Infrared Absorption Spectrum Analysis>

The spectrum was measured by using NICOLET 6700 manufactured by Thermo Fisher Scientific Inc., under the following conditions: resolution: 4 $cm^{-1}$, number of integration times: 256, and measurement wavenumber region: 400 $cm^{-1}$ to 4000 $cm^{-1}$. The spectrum was measured by ATR method, and ATR correction and smoothing of the spectrum were performed.

<Content of Cerium(IV) Hydroxide>

As a fluorescence X-ray spectrometer, ZSX 100e manufactured by Rigaku Corporation was used. All elements were measured under the following measurement conditions: tube: Rh (4 kW), atmosphere: vacuum, analysis window material: Be (thickness: 30 μm), measurement mode: SQX analysis (EZ scan), and measurement diameter: 30 mmϕ. The amount of cerium(IV) hydroxide was determined by removing the $CO_2$ components, and further subtracting all the impurities (components other than cerium compounds, such as $Al_2O_3$, $SiO_2$, $P_2O_5$, CaO, $SO_3$, $ZrO_2$, $Nd_2O_3$, $Au_2O$, Cl, and F) from all the components. A sample for measurement was obtained by placing an adsorbent in an appropriate vessel such as an aluminum ring, sandwiching the vessel by a pair of dice, and then applying thereto a pressure of 10 MPa to pelletize the adsorbent.

<Antimony Concentration, Iodine Concentration, and Ruthenium Concentration>

Quantitative analysis of antimony, iodine-127 and ruthenium was performed by using an inductively coupled plasma mass spectrometer (ICP-MS), model: Agilent 7700x manufactured by Agilent Technologies, Inc. Each of the samples was diluted by a factor of 20 with diluted nitric acid, and was analyzed as a 0.1% nitric acid matrix. As standard samples, aqueous solutions containing each of the elements in contents of 10.0 ppb, 20.0 ppb, 50.0 ppb, 100.0 ppb, 200.0 ppb and 500.0 ppb, respectively, were used.

Production Example 1

(cerium hydroxide: 99.0 wt % or more)
<Preparation of Adsorbent A>

In a 1-L beaker, 86.8 g (0.2 mol) of cerium(III) nitrate hexahydrate was weighed out, and was dissolved in 500 mL of ion-exchange water. In the resulting solution, 19.4 g (0.2 mol) of a 35% hydrogen peroxide water was added and stirred for 1 hour. To the obtained mixture, by adding ammonia water (6 mol/L), the pH of the mixture was set to 9.0, the mixture was continuously stirred for 24 hours, and thus a reaction slurry was obtained. A solid product was obtained by filtering the obtained reaction slurry, the solid product was washed, then the solid product was dried at 50° C. for 24 hours to obtain a dried product of cerium(IV) hydroxide. The obtained cerium hydroxide was verified to have a purity of 99 wt %, by a quantitative analysis using a fluorescence X-ray diffractometer. FIG. 1 shows the infrared absorption spectrum of the obtained cerium(IV) hydroxide.

The obtained cerium hydroxide was crushed, classified, and sieved with a sieve having a nominal opening of 600 μm in the JIS Z8801 standards; the fraction having passed through the sieve was further sieved with a sieve having a nominal opening of 300 μm, thus a granular product having a particle size of 300 μm or more and 600 μm or less was obtained, and consequently the adsorbent A was prepared.

Production Example 2

(cerium hydroxide: 95.0 wt %, silver phosphate: 5.0 wt %)
<Preparation of Silver Phosphate>

Silver phosphate was prepared by the following reaction between disodium hydrogen phosphate and silver nitrate.

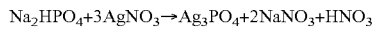

$Na_2HPO_4 + 3AgNO_3 \rightarrow Ag_3PO_4 + 2NaNO_3 + HNO_3$

In 300 mL of ion-exchange water, 35.8 g of disodium hydrogen phosphate dodecahydrate was dissolved. In 150 mL of ion-exchange water, 51.0 g of silver nitrate was dissolved, the resulting solution was added to the aqueous solution of disodium hydrogen phosphate, and after the addition, the mixed solution was reacted and aged while continuously stirred for 1 hour at normal temperature. Subsequently, the slurry after the reaction was filtered, the obtained solid content was washed, then the washed product was dried to obtain silver phosphate (gravimetrically estimated purity: 100 wt %).

<Preparation of Adsorbent B>

In a 100-mL airtight glass bottle, the cerium(IV) hydroxide obtained in Production Example 1 and silver phosphate obtained as described above were placed so as for the total weight to be 35 g. The mixing ratio was set in such a way that the content of cerium(IV) hydroxide was 95 wt % and the content of silver phosphate was 5 wt %. In the airtight glass bottle, further 50 g of ion-exchange water and 60 g (40 mL) of glass beads having a diameter of 2 mmϕ were placed, and the resulting mixture was crushed for 20 minutes using a paint shaker. The average particle size of the slurry after crushing was measured by the above-described method, and was found to be 1.2 μm. The crushed product was filtered, and then dried at 110° C. The solid product after drying was crushed with a mortar. The resulting crushed product was classified, and sieved with a sieve having a nominal opening of 600 μm in the JIS Z8801 standards: the fraction having passed through the sieve was sieved with a sieve having a nominal opening of 300 μm, thus a granular product having a granularity of 300 μm or more and 600 μm or less was obtained, and consequently the adsorbent B was prepared.

Production Example 3

(cerium hydroxide: 90.0 wt %, silver phosphate: 10.0 wt %)

An adsorbent C was obtained in the same manner as Production Example 2 except that the mixing ratio was set in such a way that the content of cerium(IV) hydroxide was 90 wt % and the content of silver phosphate was 10 wt %.

Production Example 4

(cerium hydroxide: 90.0 wt %, silver phosphate: 5.0 wt %, manganese dioxide: 5.0 wt %)

In a 100-mL airtight glass bottle, the cerium(IV) hydroxide obtained in Production Example 1, the silver phosphate obtained in Production Example 2, and manganese dioxide (activated manganese dioxide, manufactured by Japan Metals & Chemicals Co., Ltd.) were placed in a total amount of 35 g. The mixing ratio was set in the ratio of 90.0 wt % of cerium hydroxide, 5 wt % of silver phosphate, and 5 wt % of manganese dioxide. An adsorbent D was obtained in the same manner as Production Example 2, as for the rest.

Example 1

<Preparation of Simulated Contaminated Seawater 1>

By adopting the following procedures, simulated contaminated seawater containing non-radioactive antimony, iodine and ruthenium, simulating the contaminated water of Fukushima Daiichi Nuclear Power Station was prepared.

First, an aqueous solution was prepared so as to have a salt concentration of 3.0 wt % by using a chemical for producing artificial seawater of Osaka Yakken Co., Ltd., MARINE ART SF-I (sodium chloride: 22.1 g/L, magnesium chloride hexahydrate: 9.9 g/L, calcium chloride dihydrate: 1.5 g/L, anhydrous sodium sulfate: 3.9 g/L, potassium chloride: 0.61 g/L, sodium hydrogen carbonate: 0.19 g/L, potassium bromide: 96 mg/L, borax: 78 mg/L, anhydrous strontium chloride: 0.19 g/L, sodium fluoride: 3 mg/L, lithium chloride: 1 mg/L, potassium iodide: 81 μg/L, manganese chloride tetrahydrate: 0.6 µg/L, cobalt chloride hexahydrate: 2 µg/L, aluminum chloride hexahydrate: 8 µg/L, ferric chloride hexahydrate: 5 µg/L, sodium tungstate dihydrate: 2 µg/L, ammonium molybdate tetrahydrate: 18 µg/L). To the prepared aqueous solution, antimony chloride, sodium iodate and ruthenium chloride were added, and thus the simulated contaminated seawater 1 having an antimony ion concentration of 5.0 mg/L, an iodate ion concentration of 1.0 mg/L and a ruthenium ion concentration of 1.0 mg/L was prepared. A fraction of the simulated contaminated seawater 1 was sampled, and analyzed with ICP-MS; consequently, the antimony ion concentration was found to be 5.14 mg/L, the iodate ion concentration was found to be 0.90 mg/L, and the ruthenium ion concentration was found to be 0.84 mg/L.

A 2-L beaker was packed with 1.0 g of the adsorbent A having a particle size of 300 µm or more and 600 µm or less, prepared in Production Example 1; 1000 ml of simulated contaminated seawater 1 was added in the beaker, and stirred. Each fraction of the simulated contaminated seawater 1 after 24 hours and 48 hours was sampled, and the concentrations of antimony ion, iodate ion and ruthenium ion were measured. For the fraction sampled after 24 hours, the antimony ion concentration was found to be 0.42 mg/L, the iodate ion concentration was found to be 0.59 mg/L, and the ruthenium ion concentration was found to be 0.00 mg/L. For the fraction sampled after 48 hours, the antimony ion concentration was found to be 0.21 mg/L, the iodate ion concentration was found to be 0.42 mg/L, and the ruthenium ion concentration was found to be 0.00 mg/L.

From the antimony ion, iodate ion and ruthenium ion concentrations after 24 hours and 48 hours of the treatment with the adsorbent, the removal rates (%) of these ions were calculated. The results thus obtained are shown in Table 1. For antimony and ruthenium, the 24 hours of the treatment achieved the removal rates of 90% or more, showing that a short time treatment is possible. For iodine, the 48 hours of the treatment achieved a removal rate of 50% or more; thus, it can be said that antimony, iodine and ruthenium can all be removed by the present adsorbent.

TABLE 1

|  | 24 hours | 48 hours |
|---|---|---|
| Antimony | 91.8% | 95.8% |
| Iodine | 34.1% | 53.3% |
| Ruthenium | 99.9% | 99.9% |

Example 2

<Preparation of Simulated Contaminated Seawater 2>

By adopting the following procedures, simulated contaminated seawater containing non-radioactive antimony, iodine and ruthenium, simulating the contaminated water of Fukushima Daiichi Nuclear Power Station was prepared.

An aqueous solution was prepared so as to have a salt concentration of 3.0 wt % by using a chemical for producing artificial seawater of Osaka Yakken Co., Ltd., MARINE ART SF-1 (sodium chloride: 22.1 g/L, magnesium chloride hexahydrate: 9.9 g/L, calcium chloride dihydrate: 1.5 g/L, anhydrous sodium sulfate: 3.9 g/L, potassium chloride: 0.61 g/L, sodium hydrogen carbonate: 0.19 g/L, potassium bromide: 96 mg/L, borax: 78 mg/L, anhydrous strontium chloride: 0.19 g/L, sodium fluoride: 3 mg/L, lithium chloride: 1 mg/L, potassium iodide: 81 µg/L, manganese chloride tetrahydrate: 0.6 µg/L, cobalt chloride hexahydrate: 2 µg/L, aluminum chloride hexahydrate: 8 µg/L, ferric chloride hexahydrate: 5 µ/L, sodium tungstate dihydrate: 2 µg/L, ammonium molybdate tetrahydrate: 18 µg/L). To the prepared aqueous solution, antimony chloride, sodium iodate, sodium iodide and ruthenium chloride were added, and thus the simulated contaminated seawater 2 having an antimony ion concentration of 5.0 mg/L, an iodate ion ($IO_3^-$) concentration of 0.5 mg/L, an iodide ion ($I^-$) concentration of 0.5 mg/L and a ruthenium ion concentration of 1.0 mg/L was prepared. A fraction of the simulated contaminated seawater 2 was sampled, and analyzed with ICP-MS; consequently, the antimony ion concentration was found to be 4.07 mg/L, the iodine concentration was found to be 1.00 mg/L, and the ruthenium ion concentration was found to be 0.82 mg/L. Sum of the iodate ion concentration and the iodide ion concentration was defined as the iodine concentration.

A 2-L beaker was packed with 1.0 g of the adsorbent B having a particle size of 300 µm or more and 600 µm or less, prepared in Production Example 2; 1000 ml of simulated contaminated seawater 2 was added in the beaker, and stirred. Each fraction of the simulated contaminated seawater 2 after 24 hours and 48 hours was sampled, and the concentrations of antimony ion, iodate ion, iodide ion and ruthenium ion were measured. For the fraction sampled after 24 hours, the antimony ion concentration was found to be 0.11 mg/L, the iodine concentration was found to be 0.29 mg/L, and the ruthenium ion concentration was found to be 0.00 mg/L. For the fraction sampled after 48 hours, the antimony ion concentration was found to be 0.08 mg/L, the iodine concentration was found to be 0.27 mg/L, and the ruthenium ion concentration was found to be 0.00 mg/L. Sum of the iodate ion concentration and the iodide ion concentration was defined as the iodine concentration.

From the antimony, iodine and ruthenium concentrations after 24 hours and 48 hours of the treatment with the adsorbent, the removal rates (%) of these ions were calculated. The results thus obtained are shown in Table 2. For antimony and ruthenium, the 24 hours of the treatment achieved the removal rates of 97% or more; for iodine, the 24 hours of the treatment achieved the removal rate of 71% or more; thus, it can be said that the adsorbent containing cerium(IV) hydroxide and silver phosphate can also remove iodide ion in addition to iodate ion.

TABLE 2

|  | 24 hours | 48 hours |
|---|---|---|
| Antimony | 97.3% | 98.0% |
| Iodine | 71.1% | 73.0% |
| Ruthenium | 99.9% | 99.9% |

Example 3

<Preparation of Simulated Contaminated Seawater 3>

By adopting the following procedures, simulated contaminated seawater containing non-radioactive antimony ions, simulating the contaminated water of Fukushima Daiichi Nuclear Power Station was prepared.

First, by using an ordinary salt (Nami Shio) of Diasalt Co., Ltd., an aqueous solution was prepared so as to have a salt concentration of 1.0 wt %. To the prepared aqueous solution, cesium chloride was added so as for the cesium concentration to be 1 mg/L, strontium chloride was added so as for the strontium concentration to be 10 mg/L, calcium chloride was added so as for the calcium concentration to be 300 mg/L, magnesium chloride was added so as for the magnesium concentration to be 400 mg/L, and antimony potassium tartrate was added so as for the antimony concentration to be 10 mg/L; thus, the simulated contaminated seawater 3 containing, as the concomitant ions, high concentrations of chloride ions, cesium ions, strontium ions, magnesium ions, calcium ions, and sodium ions was prepared. A fraction of the simulated contaminated seawater 3 was sampled, and analyzed with ICP-MS; consequently, the antimony ion concentration was found to be 10.04 mg/L to 12.06 mg/L.

A glass column having an inner diameter of 16 mm was packed with 20 ml of the adsorbent A having a particle size of 300 μm to 600 μm, prepared in Production Example 1, so as for the layer height to be 10 cm; the simulated contaminated seawater 3 was passed through the column at a flow rate of 67 ml/min (linear velocity (LV): 20 m/h, space velocity (SV): 200 $h^{-1}$); and the outlet water was periodically sampled, and the antimony ion concentration was measured. The results of the analysis of the outlet water were such that the antimony ion concentration was 0.20 mg/L to 4.68 mg/L.

Figure 2:
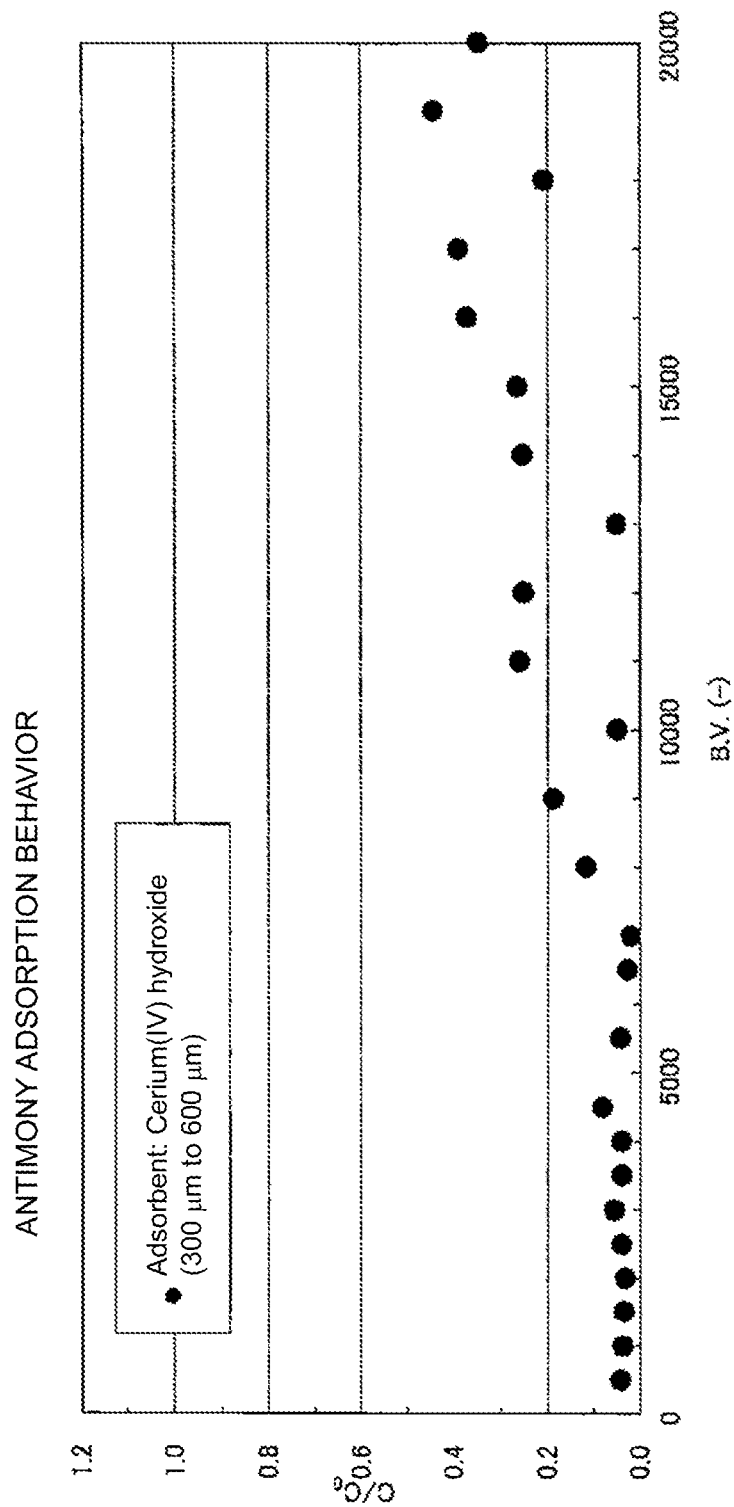
FIG. 2 is a graph showing the antimony adsorption removal performance in Example 3.

The antimony removal performance is shown in FIG. 2. In FIG. 2, the horizontal axis is the B.V. representing the ratio of the volume of the simulated contaminated seawater passing through the column to the volume of the adsorbent; the vertical axis represents the value obtained by dividing the antimony ion concentration (C) at the column outlet by the antimony concentration ($C_0$) at the column inlet.

As can be seen from FIG. 2, when the layer height was 10 cm and the space velocity (SV) was 200 $h^{-1}$, antimony was able to be removed by adsorption to an extent of nearly 100% for the B.V. up to approximately 7000.

Example 4

<Preparation of Simulated Contaminated Seawater 4>

By adopting the following procedures, simulated contaminated seawater containing non-radioactive iodate ions, simulating the contaminated water of Fukushima Daiichi Nuclear Power Station was prepared.

First, by using an ordinary salt (Nami Shio) of Diasalt Co., Ltd., an aqueous solution was prepared so as to have a salt concentration of 0.3 wt %. To the prepared aqueous solution, cesium chloride was added so as for the cesium concentration to be 1 mg/L, strontium chloride was added so as for the strontium concentration to be 10 mg/L, calcium chloride was added so as for the calcium concentration to be 400 mg/L, magnesium chloride was added so as for the magnesium concentration to be 400 mg/L, and sodium iodate was added so as for the iodate ion concentration to be 1 mg/L; thus, the simulated contaminated seawater 4 containing, as the concomitant ions, high concentrations of chloride ions, cesium ions, strontium ions, magnesium ions, calcium ions, and sodium ions was prepared. A fraction of the simulated contaminated seawater 4 was sampled, and analyzed with ICP-MS; consequently, the iodate ion concentration was found to be 0.99 mg/L to 1.58 mg/L.

A glass column having an inner diameter of 16 mm was packed with 20 ml of the adsorbent having a particle size of 300 μm or more and 600 μm or less, prepared in Production Example 1, so as for the layer height to be 10 cm; the simulated contaminated seawater 4 was passed through the column at a flow rate of 67 ml/min (linear velocity (LV): 20 m/h, space velocity (SV): 200 $h^{-1}$); and the outlet water was periodically sampled, and the iodate ion concentration was measured. The results of the analysis of the outlet water were such that the iodate ion concentration was 0.05 mg/L to 0.52 mg/L.

In addition, a glass column having an inner diameter of 16 mm was similarly packed with 20 ml of the adsorbent A' obtained by sieving cerium(IV) hydroxide prepared in Production Example 1 through a sieve having a nominal opening of 1 mm (1000 μm) in the JIS Z8801 standards, subsequently sieving with a sieve having a nominal opening of 500 μm, and classifying to fall within a particle size range of 500 μm or more and 1000 μm or less, so as for the layer height to be 10 cm; the simulated contaminated seawater 4 was passed through the column at a flow rate of 67 ml/min (linear velocity (LV): 20 m/h, space velocity (SV): 200 $h^{-1}$); and the outlet water was periodically sampled, and the iodate ion concentration was measured.

Figure 3:
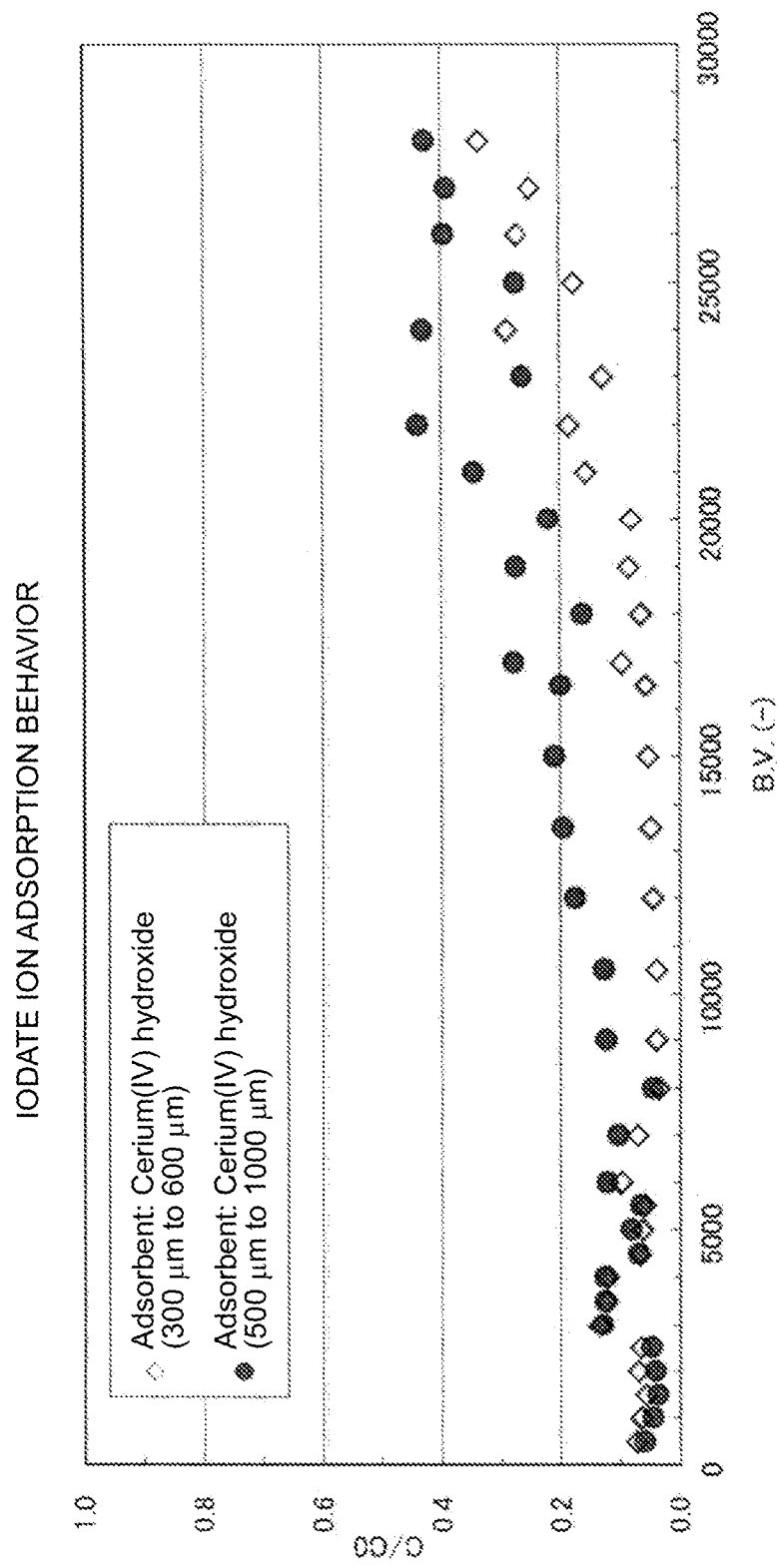
FIG. 3 is a graph showing the iodate ion adsorption removal performance in Example 4.

The iodate ion removal performance is shown in FIG. 3. In FIG. 3, the horizontal axis is the B.V. representing the ratio of the volume of the simulated contaminated seawater passing through the column to the volume of the adsorbent; the vertical axis represents the value obtained by dividing the iodate ion concentration (C) at the column outlet by the iodate ion concentration ($C_0$) at the column inlet.

As can be seen from FIG. 3, the adsorbent A (marked with "◇" in FIG. 3) having a particle size of 300 μm or more and 600 μm or less was able to remove iodate ions by adsorption to an extent of nearly 90% for the B.V. up to approximately 15000, and to an extent of nearly 60% even for the B.V. of approximately 30000; the adsorbent A' (marked with "●" in FIG. 3) having a particle size of 500 μm or more and 1000 μm or less was able to remove iodate ion by adsorption to an extent of nearly 90% for the B.V. up to 10000, and to an extent of nearly 60% even for the B.V. of approximately 30000.

Example 5

<Preparation of Simulated Contaminated Seawater 5>

By adopting the following procedures, a simulated contaminated seawater 5 containing non-radioactive ruthenium ions, simulating the contaminated water of Fukushima Daiichi Nuclear Power Station was prepared.

First, by using an ordinary salt (Nami Shio) of Diasalt Co., Ltd., an aqueous solution was prepared so as to have a salt concentration of 0.3 wt %. To the prepared aqueous solution, cesium chloride was added so as for the cesium concentration to be 1 mg/L, strontium chloride was added so as for the strontium concentration to be 10 mg/L, calcium chloride was added so as for the calcium concentration to be 400 mg/L, magnesium chloride was added so as for the magnesium concentration to be 400 mg/L, and ruthenium chloride was added so as for the ruthenium ion concentration to be 1 mg/L; thus, the simulated contaminated seawater 5 containing, as the concomitant ions, high concentrations of chloride ions, cesium ions, strontium ions, magnesium ions, calcium ions, and sodium ions was prepared. A fraction of the simulated contaminated seawater 5 was sampled, and analyzed with ICP-MS; consequently, the ruthenium ion concentration was found to be 0.54 mg/L to 0.87 mg/L.

A glass column having an inner diameter of 16 mm was packed with 20 ml of the adsorbent A having a particle size of 300 μm or more and 600 μm or less, prepared in Production Example 1, so as for the layer height to be 10 cm; the simulated contaminated seawater 5 was passed through the column at a flow rate of 67 ml/min (linear velocity (LV): 20 m/h, space velocity (SV): 200 $h^{-1}$); and the outlet water was periodically sampled, and the ruthenium concentration was measured. The results of the analysis of the outlet water were such that the ruthenium ion concentration was 0.01 mg/L to 0.19 mg/L.

Figure 4:
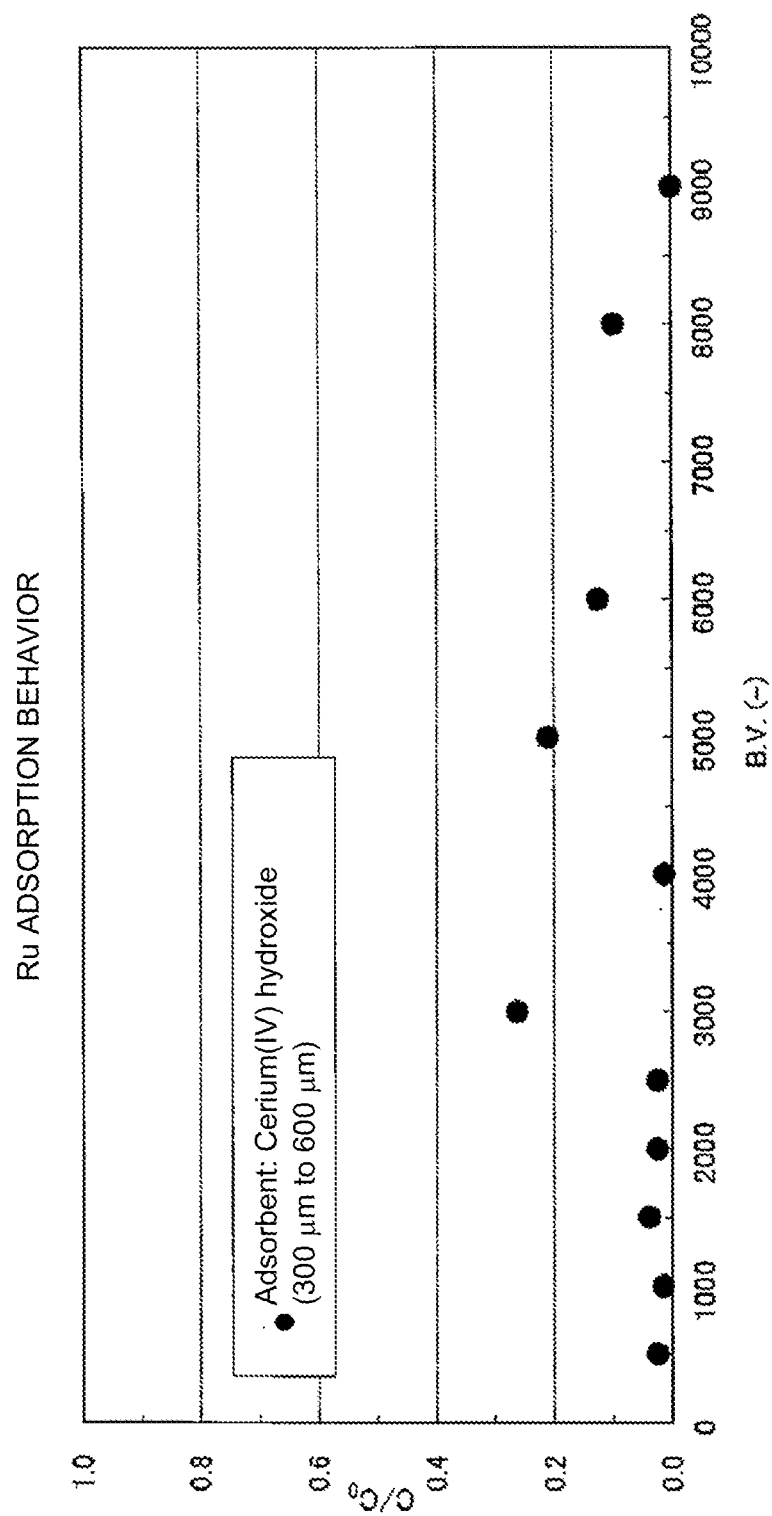
FIG. 4 is a graph showing the ruthenium adsorption removal performance in Example 5.

The ruthenium ion removal performance is shown in FIG. 4. In FIG. 4, the horizontal axis is the B.V. representing the ratio of the volume of the simulated contaminated seawater having passed through the column to the volume of the adsorbent; the vertical axis represents the value obtained by dividing the ruthenium ion concentration (C) at the column outlet by the ruthenium ion concentration ($C_0$) at the column inlet.

As can be seen from FIG. 4, ruthenium was able to be removed by adsorption to an extent of nearly 100% for the B.V. up to approximately 2500, and to an extent of nearly 80% for the B.V. up to approximately 9000.

Example 6

<Preparation of Simulated Contaminated Seawater 6>

By adopting the following procedures, simulated contaminated seawater containing non-radioactive iodate ions, simulating the contaminated water of Fukushima Daiichi Nuclear Power Station was prepared.

First, by using an ordinary salt (Nami Shio) of Diasalt Co., Ltd., an aqueous solution was prepared so as to have a salt concentration of 0.3 wt %. To the prepared aqueous solution, cesium chloride was added so as for the cesium concentration to be 1 mg/L, strontium chloride was added so as for the strontium concentration to be 10 mg/L, calcium chloride was added so as for the calcium concentration to be 400 mg/L, magnesium chloride was added so as for the magnesium concentration to be 400 mg/L, and sodium iodate was added so as for the iodate ion concentration to be 10 mg/L; thus, the simulated contaminated seawater 6 containing, as the concomitant ions, high concentrations of chloride ions, cesium ions, strontium ions, magnesium ions, calcium ions, and sodium ions was prepared. A fraction of the simulated contaminated seawater 6 was sampled, and analyzed with ICP-MS; consequently, the iodate ion concentration was found to be 9.72 mg/L to 10.97 mg/L.

Two glass columns having an inner diameter of 16 mm were packed with 20 ml of the adsorbent B and 20 ml of the adsorbent C, each having a particle size of 300 μm or more and 600 μm or less, prepared in Production Example 2 and Production Example 3, respectively, so as for each of the layer heights to be 10 cm; the simulated contaminated seawater 6 was passed through each of the columns at a flow rate of 67 ml/min (linear velocity (LV): 20 m/h, space velocity (SV): 200 $h^{-1}$); and the outlet water of each of the columns was periodically sampled, and the iodate ion concentration was measured. The results of the analysis of the outlet waters were such that the iodate ion concentrations were 0.06 mg/L to 8.89 mg/L.

Figure 5:
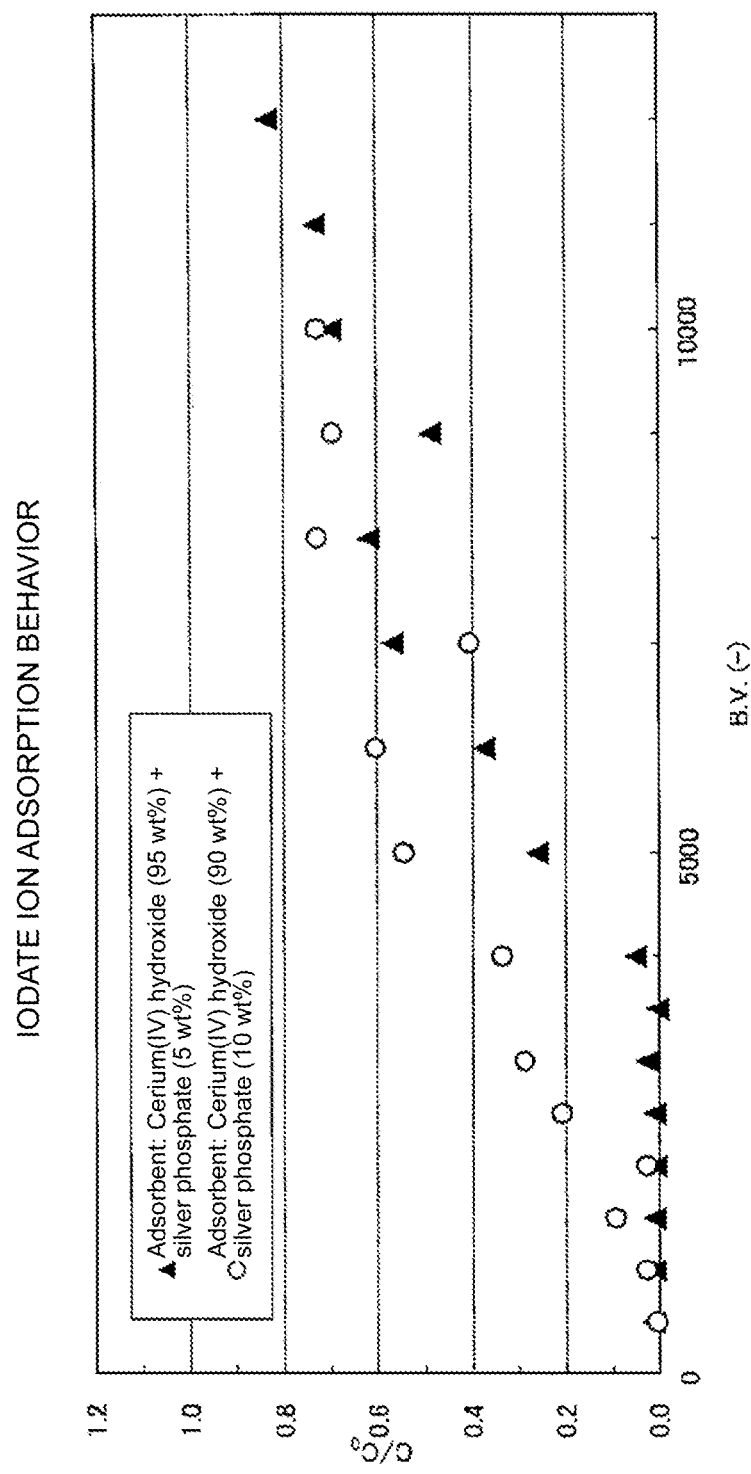
FIG. 5 is a graph showing the iodate ion adsorption removal performance in Example 6.

The iodate ion removal performance is shown in FIG. 5. In FIG. 5, the horizontal axis is the B.V. representing the ratio of the volume of the simulated contaminated seawater passing through the column to the volume of the adsorbent; the vertical axis represents the value obtained by dividing the iodate ion concentration (C) at the column outlet by the iodate ion concentration ($C_0$) at the column inlet.

As can be seen from FIG. 5, the adsorbent (marked with "▲" in FIG. 5) containing 5 wt % of silver phosphate was able to remove iodate ions by adsorption to an extent of nearly 100% for the B.V. up to approximately 4000, and the adsorbent (marked with "○" in FIG. 5) containing 10 wt % of silver phosphate was able to remove iodate ions by adsorption to an extent of nearly 100% for the B.V. up to approximately 2500.

Example 7

<Preparation of Simulated Contaminated Seawater 7>

By adopting the following procedures, simulated contaminated seawater 7 containing non-radioactive iodide ions, simulating the contaminated water of Fukushima Daiichi Nuclear Power Station was prepared.

First, by using an ordinary salt (Nami Shio) of Diasalt Co., Ltd., an aqueous solution was prepared so as to have a salt concentration of 0.3 wt %. To the prepared aqueous solution, cesium chloride was added so as for the cesium concentration to be 1 mg/L, strontium chloride was added so as for the strontium concentration to be 10 mg/L, calcium chloride was added so as for the calcium concentration to be 400 mg/L, magnesium chloride was added so as for the magnesium concentration to be 400 mg/L, and sodium iodate was added so as for the iodide ion concentration to be 10 mg/L; thus, the simulated contaminated seawater 7 containing, as the concomitant ions, high concentrations of chloride ions, cesium ions, strontium ions, magnesium ions, calcium ions, and sodium ions was prepared. A fraction of the simulated contaminated seawater 7 was sampled, and analyzed with ICP-MS; consequently, the iodide ion concentration was found to be 7.88 mg/L to 9.73 mg/L.

Two glass columns having an inner diameter of 16 mm were packed with 20 ml of the adsorbent B and 20 ml of the adsorbent C, each having a particle size of 300 μm or more and 600 μm or less, prepared in Production Example 2 and Production Example 3, respectively, so as for each of the layer heights to be 10 cm; the simulated contaminated seawater 7 was passed through each of the columns at a flow rate of 67 ml/min (linear velocity (LV): 20 m/h, space velocity (SV): 200 $h^{-1}$); and the outlet water of each of the columns was periodically sampled, and the iodide ion concentration was measured. The results of the analysis of the outlet water were such that the iodide ion concentrations were 0.03 mg/L to 8.98 mg/L.

Figure 6:
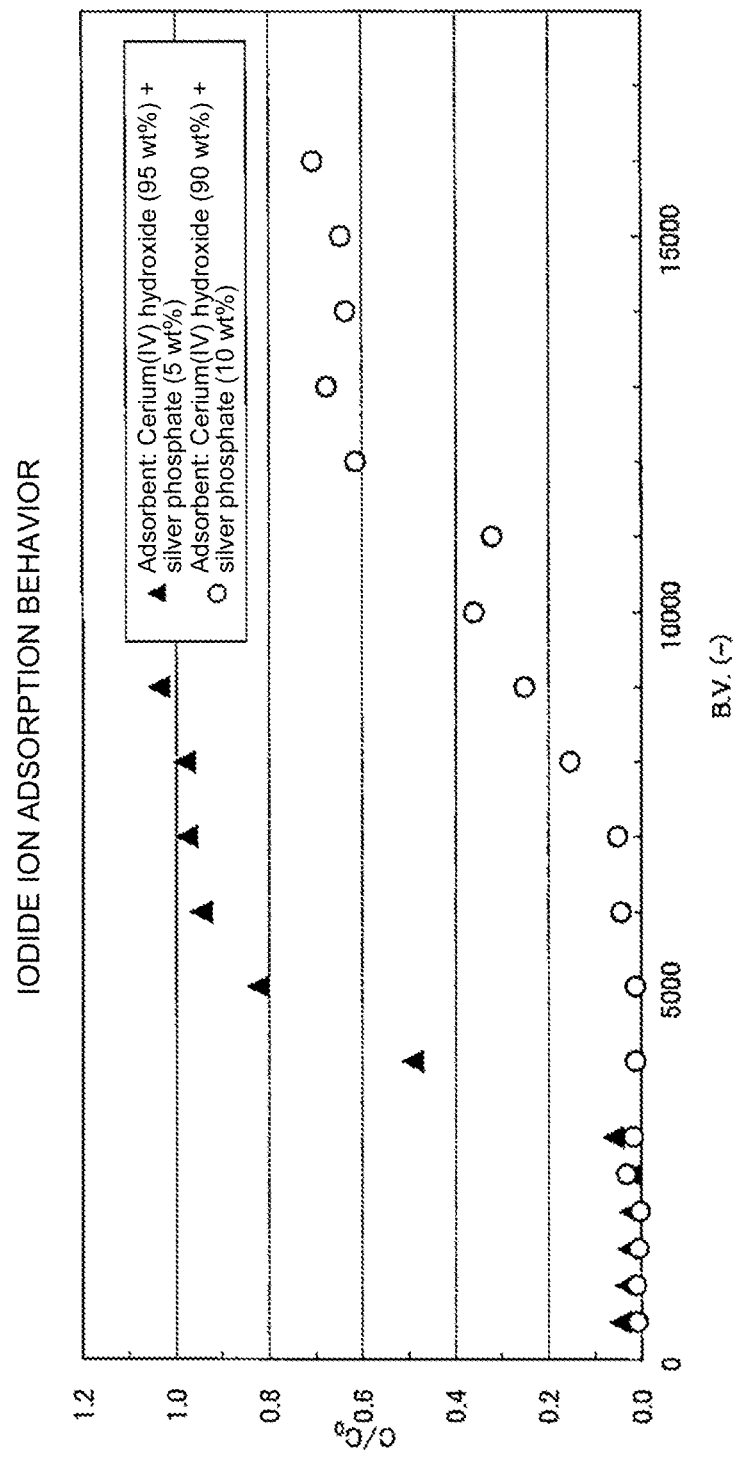
FIG. 6 is a graph showing the iodide ion adsorption removal performance in Example 7.

The iodide ion removal performance is shown in FIG. 6. In FIG. 6, the horizontal axis is the B.V. representing the ratio of the volume of the simulated contaminated seawater passing through the column to the volume of the adsorbent; the vertical axis represents the value obtained by dividing the iodide ion concentration (C) at the column outlet by the iodide ion concentration ($C_0$) at the column inlet.

As can be seen from FIG. 6, the adsorbent B (marked with "▲" in FIG. 6) containing 5 wt % of silver phosphate was able to remove iodide ions by adsorption to an extent of nearly 100% for the B.V. up to approximately 3000, and the adsorbent C (marked with "○" in FIG. 6) containing 10 wt % of silver phosphate was able to remove iodide ions by adsorption to an extent of nearly 100% for the B.V. up to approximately 5000.

Example 8

<Preparation of Simulated Contaminated Seawater 8>

By adopting the following procedures, simulated contaminated seawater containing non-radioactive ruthenium ions, simulating the contaminated water of Fukushima Daiichi Nuclear Power Station was prepared.

An aqueous solution was prepared so as to have a salt concentration of 0.3 wt % by using a chemical for producing artificial seawater of Osaka Yakken Co., Ltd., MARINE ART SF-1 (sodium chloride: 22.1 g/L, magnesium chloride hexahydrate: 9.9 g/L, calcium chloride dihydrate: 1.5 g/L, anhydrous sodium sulfate: 3.9 g/L, potassium chloride: 0.61 g/L, sodium hydrogen carbonate: 0.19 g/L, potassium bromide: 96 mg/L, borax: 78 mg/L, anhydrous strontium chloride: 0.19 g/L, sodium fluoride: 3 mg/L, lithium chloride: 1 mg/L, potassium iodide: 81 μg/L, manganese chloride tetrahydrate: 0.6 μg/L, cobalt chloride hexahydrate: 2 μg/L, aluminum chloride hexahydrate: 8 μg/L, ferric chloride hexahydrate: 5 μg/L, sodium tungstate dihydrate: 2 μg/L, ammonium molybdate tetrahydrate: 18 μg/L). To the prepared aqueous solution, ruthenium chloride was added so as for the ruthenium ion concentration to be 1 mg/L, moreover the pH of the aqueous solution was adjusted to 3 by using hydrochloric acid, and thus, the simulated contaminated seawater 8 was prepared. A fraction of the simulated contaminated seawater 8 was sampled, and analyzed with ICP-MS; consequently, the ruthenium ion concentration was found to be 0.90 mg/L to 1.09 mg/L.

Two glass columns having an inner diameter of 16 mm were packed with 20 ml of the adsorbent D having a particle size of 300 μm to 600 μm, prepared in Production Example 4 and only with cerium(IV) hydroxide, respectively, so as for each of the layer heights to be 10 cm; the simulated contaminated seawater 8 was passed through each of the columns at a flow rate of 67 ml/min (linear velocity (LV): 20 m/h, space velocity (SV): 200 h$^{-1}$); and the outlet water of each of the columns was periodically sampled, and the ruthenium ion concentration was measured. The results of the analysis of the outlet water were such that the ruthenium ion concentrations were 0.00 mg/L to 0.44 mg/L.

Figure 7:
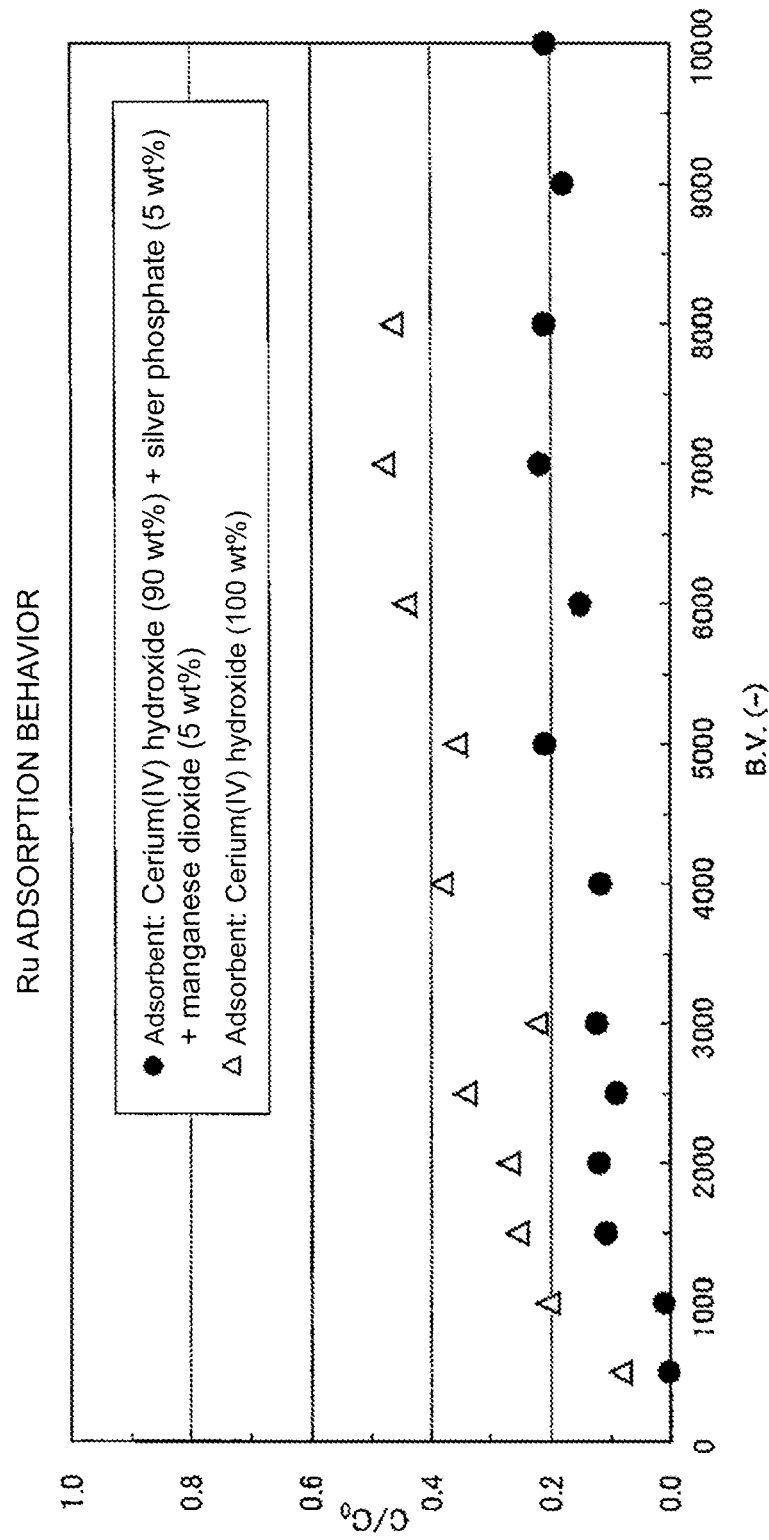
FIG. 7 is a graph showing the ruthenium adsorption removal performance in Example 8.

The ruthenium ion removal performance is shown in FIG. 7. In FIG. 7, the horizontal axis is the B.V. representing the ratio of the volume of the simulated contaminated seawater passing through the column to the volume of the adsorbent; the vertical axis represents the value obtained by dividing the ruthenium ion concentration (C) at the column outlet by the ruthenium ion concentration ($C_0$) at the column inlet.

As can be seen from FIG. 7, as compared with the case of only cerium(IV) hydroxide (marked with "Δ" in FIG. 7), the ruthenium adsorption performance of the adsorbent D (marked with "●" in FIG. 7) containing cerium(IV) hydroxide, 5 wt % of silver phosphate and 5 wt % of manganese dioxide was improved.

The invention claimed is:

1. An adsorbent capable of adsorbing radioactive antimony, radioactive iodine and radioactive ruthenium, the adsorbent comprising cerium(IV) hydroxide, wherein the cerium(IV) hydroxide has the following properties:
   (1) a granular form having a particle size of 250 μm or more and 1200 μm or less,
   (2) in a thermogravimetric analysis, a weight reduction ratio is 4.0% or more and 10.0% or less when the temperature is increased from 200° C. to 600° C., and
   (3) in an infrared absorption spectrum analysis, absorption peaks are observed in ranges of 3270 cm$^{-1}$ or more and 3330 cm$^{-1}$ or less, 1590 cm$^{-1}$ or more and 1650 cm$^{-1}$ or less, and 1410 cm$^{-1}$ or more and 1480 cm$^{-1}$ or less.

2. The adsorbent according to claim 1, wherein a content of the cerium(IV) hydroxide is 99.0 wt % or more.

3. The adsorbent according to claim 1, wherein a content of the cerium(IV) hydroxide is 90.0 wt % or more and 99.5 wt % or less, and the adsorbent further comprises silver phosphate in a content of 0.5 wt % to 10.0 wt %.

4. The adsorbent according to claim 1, wherein a content of the cerium(IV) hydroxide is 90.0 wt % or more and 99.0 wt % or less, and the adsorbent further comprises silver phosphate in a content of 0.5 wt % or more and 5.0 wt % or less and manganese dioxide in a content of 0.5 wt % or more and 5.0 wt % or less.

5. A treatment method of radioactive waste water containing radioactive antimony, radioactive iodine and radioactive ruthenium, the treatment method comprising passing the radioactive waste water containing radioactive antimony, radioactive iodine and radioactive ruthenium through an adsorption column packed with the adsorbent according to claim 1, to adsorb the radioactive antimony, radioactive iodine and radioactive ruthenium on the adsorbent, wherein the absorbent is packed to a height of 10 cm or more and 300 cm or less of the adsorption column, and wherein the radioactive waste water is passed through the adsorption column at a linear velocity (LV) of 1 m/h or more and 40 m/h or less and a space velocity (SV) of 200 h$^{-1}$ or less.

6. The treatment method according to claim 5, wherein the radioactive waste water further contains a Na ion, a Ca ion and/or a Mg ion.

* * * * *